United States Patent [19]

Neves et al.

[11] Patent Number: 4,634,384

[45] Date of Patent: Jan. 6, 1987

[54] HEAD AND/OR EYE TRACKED OPTICALLY BLENDED DISPLAY SYSTEM

[75] Inventors: Fernando B. Neves, Daytona Beach; Jimmy Page, Ormond Beach, both of Fla.

[73] Assignee: General Electric Company, Syracuse, N.Y.

[21] Appl. No.: 576,432

[22] Filed: Feb. 2, 1984

[51] Int. Cl.$^4$ .............................................. G09B 9/08
[52] U.S. Cl. ...................................... 434/44; 358/104; 434/40
[58] Field of Search ..................... 434/43, 44; 358/104, 358/61

[56] References Cited

U.S. PATENT DOCUMENTS

| | | | |
|---|---|---|---|
| 3,265,811 | 8/1966 | Ellis | 178/5.4 |
| 3,904,289 | 9/1975 | Yager | 353/122 |
| 4,127,322 | 11/1978 | Jacobson et al. | 358/61 |
| 4,246,605 | 1/1981 | LaRussa | 358/104 |
| 4,348,186 | 9/1982 | Harvey et al. | 434/44 |
| 4,425,028 | 1/1984 | Gagnon et al. | 358/61 |
| 4,439,157 | 3/1984 | Breglia et al. | 434/44 |
| 4,464,018 | 8/1984 | Gagnon et al. | 358/61 |

OTHER PUBLICATIONS

J. D. Basinger, J. M. Wilson, R. A. Risher, "The Technical Contributions of the Tactical Combat Trainer Development Program"; Proceedings of the 4th Interservice/Industry Training Equipment Conf., vol. I, Nov. 16–18, 1982; pp. 217 and 224–230.

Primary Examiner—Richard C. Pinkham
Assistant Examiner—Leo P. Picard
Attorney, Agent, or Firm—Stephen A. Young; Carl W. Baker

[57] ABSTRACT

An area of interest display system of the type wherein area of interest imagery of relatively great detail and resolution is displayed in the spatial position of the foveal region of the eye of an observer and background imagery of relatively lesser detail and resolution is displayed about the area of interest imagery is disclosed. An improved display is achieved by optically blending and projecting the area of interest imagery and the background imagery with a common servo optical system.

5 Claims, 7 Drawing Figures

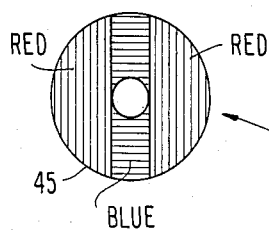
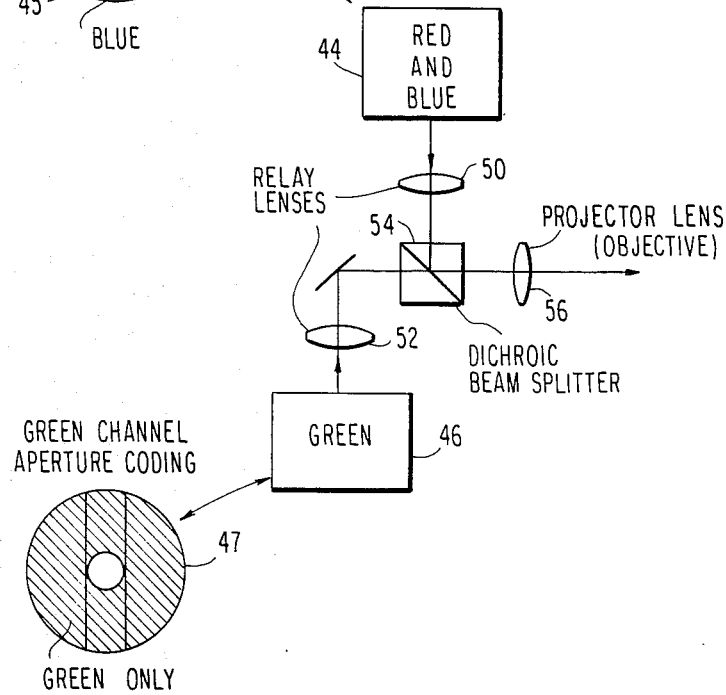
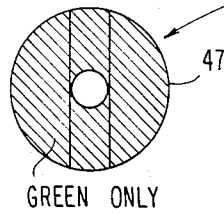
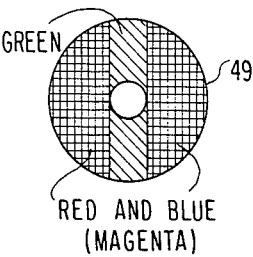
FIG. 4
FIG. 4A

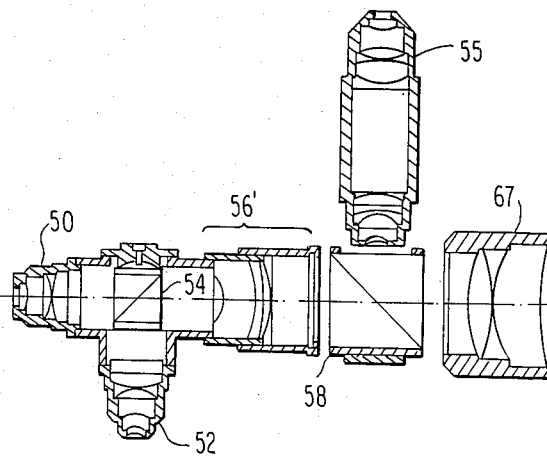
FIG. 5
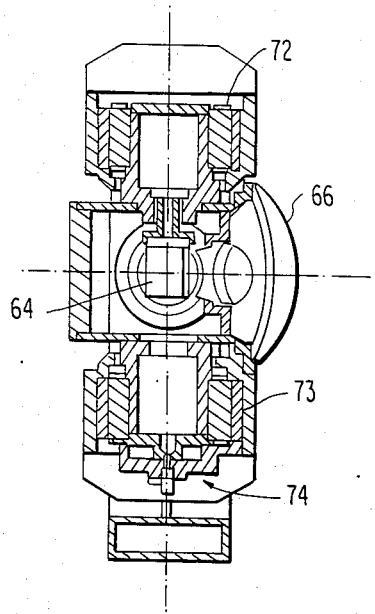
FIG. 5A
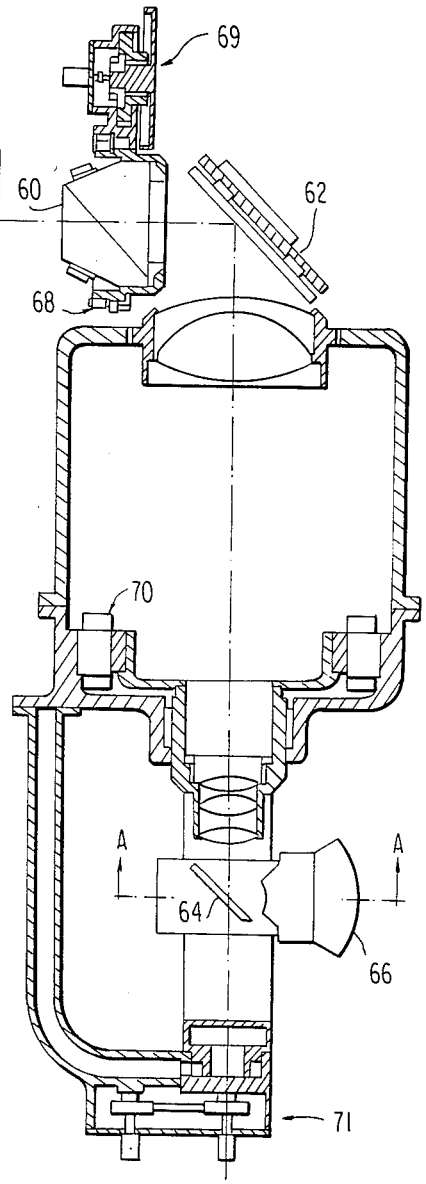

HEAD AND/OR EYE TRACKED OPTICALLY BLENDED DISPLAY SYSTEM

The Government has rights in this invention pursuant to Contract Number N61339-82-C-0083 awarded by the Department of the Navy.

FIELD OF THE INVENTION

This invention generally relates to computer image generated (CIG) display systems of the type used in aircraft flight simulators. More particularly, the purpose of this invention is to provide the best possible display with wide field of view (FOV) and high resolution taking advantage of the facts that the eye has a very limited FOV (about 4°) with high acuity and that the head tends to track the eye line of sight. The invention is most advantageously employed in a domed training device wherein the trainee is seated within the dome and images are projected onto the inner surface of the dome.

BACKGROUND OF THE INVENTION

The principle application area for CIG has been that of visual training simulators which present scenes to an observer or trainee to allow the observer to practice some task, such as flying an airplane. In a flight simulator, a three-dimensional model of the desired "gaming area" is prepared and stored on magnetic disk or similar bulk storage media. This model is called the visual data base. The visual simulator combines an image generator with an electro-optical display system such as a cathode ray tube (CRT), light valve projector or similar display. The image generator reads in blocks of three-dimensional data from the disk and transforms this data into two-dimensional scene descriptions. The two-dimensional data are converted to analog video that is presented to the operator via the display. The generated imagery is meant to be representative of the true scenes that the operator would see if the operator were actually performing the task being simulated. The generation of display images is said to be in "real time" which is normally taken to mean 30 frames per second, as in the U.S. television standard. CIG systems are described in detail in the book entitled *Computer Image Generation* edited by Bruce J. Schacter and published by Wiley-Interscience (1983).

Absolute realism is not achieved in CIG systems, but fortunately the training mission can be accomplished satisfactorily despite this apparent drawback. Recent developments have, moreover, remarkably improved the degree of realism attainable. One such development exploits the fact that the high-resolution viewing area of the eye is relatively small. This high-resolution area is the fovea of the eye, which is the only area where small details may be perceived. Surrounding the fovea is a peripheral area where the resolution of detail is low but there is a high sensitivity to movement. By taking advantage of these facts, the FOV requirement for instantaneous high resolution and high detail is greatly reduced thereby reducing the design requirements of the CIG as well as the display system. The concept in the area of interest (AOI) approach in this type of display system is to provide imagery in sufficient detail and resolution in the spatial position where the trainee is placing his attention to accomplish his training task. This point of interest, the AOI, is where the trainee is concentrating his gaze, that is where the foveal region of the eye is directed by the motion of the head and eyes. The goal of the AOI display concept is to provide this imagery while not presenting any negative cues at the AOI or in the peripheral vision field of the trainee.

An example of an AOI display system is disclosed in U.S. Pat. No. 4,348,186 issued to Harvey et al. This system provides a display of computer generated images that allocates edges or other forms of resolution by proximity to the trainee's instantaneous area of interest. This is accomplished by projecting a computer generated image onto the domed screen by apparatus which aligns with the trainee's line of sight, as determined by an eye tracker and/or a head tracker. The computer image generator is programmed with a preselected scene arrangement and is responsive to operator actuated controls to simulate a flight. The generator is also responsive to head, and most preferably, eye movements of the operator to apportion definition of the image with the scene displayed. The specific apparatus disclosed includes a helmet mounted projector. The projected image comprises a larger background image of low definition and the AOI image of high definition. These two portions of the projected image are projected by the same helmet mounted projector and preferably, the portions flow together on the screen in a smooth or nearly smooth transition. The manner in which the smooth transition between the low definition and high definition display portions is accomplished is not specifically disclosed. Harvey et al suggest that the transitions between levels of detail at the regional boundaries could be carried out by varied interpolation procedures which depend upon the display system utilized.

One major problem in AOI displays is the registration, or image contiguity, across the AOI and background transition. There are basically two approaches which have been followed in the design of AOI display systems. Either the AOI imagery is superimposed over the background imagery or a hole is "cut out" of the background image into which the AOI scene is inset. The inset approach is generally favored because the superimposition method produces a bright halo-like effect that detracts from the resulting display. However, registration errors between the AOI image and the hole cutout of the background image for the AOI image to be inset causes the AOI to have a dark border on one side and the "superimposed halo" on the opposite side. In addition, the shape of the background cutout is dynamically changing as a function of AOI position. Another major problem for any AOI concept is how to transition from the high resolution AOI scene to a lower resolution background scene. The crudest form would be an abrupt transition, but this is not satisfactory and a blending in brightness is called for. This can be done electronically by creating a pixel based staircase (in luminance) for the background and a complementary matching staircase, of several pixels per background pixel, for the AOI. This gives a discrete appearance and must be done electronically which is expensive.

SUMMARY OF THE INVENTION

It is therefore an object of the present invention to provide an improved AOI CIG display wherein a smooth transition is achieved between the AOI and the background.

It is another object of the present invention to provide a CIG display of the AOI type wherein the AOI and background scene are always in the same relative position to each other.

It is a further object of the invention to provide a light valve projection system having improved contrast and subjective qualities.

These and other objects are achieved by optically blending the higher resolution AOI scene with the lower resolution background scene so that there is no perceptible boundary between the two scenes as with electronic techniques. According to the invention, the blended AOI scene and background scene are projected from one spatial point onto a dome surface, for example, via a servo system that tracks the eye line of sight or the head vector. In a preferred embodiment of the invention, light valve projectors are used. One projector projects the red, green and blue (RGB) components of the AOI image. The background image is projected by a light valve projector composed of multiple Schlieren light valves. More specifically, the background image light projector includes a green component projector and a separate projector for the red and blue components. The images projected by these two projectors are combined by a dichroic filter. This arrangement allows a doubling of light output and a higher resolution than is attainable with a single light valve projector. The combined background image is combined with the AOI image by another dichroic filter and the resulting composite image is projected by a servoed optical system.

BRIEF DESCRIPTION OF THE DRAWINGS

The foregoing and other objects, aspects and advantages of the invention will be better understood from the following detailed description of a preferred embodiment with reference to the accompanying drawings, in which:

FIG. 4 is a block diagram illustrating the composite background image projector according to the invention;

FIG. 4A is a diagram showing a conventional filter plate used in a Schlieren light valve projector;

FIG. 5 is a cross-sectional view of the servo optical component used in the preferred embodiment of the AOI CIG display system; and FIG. 5A is a cross-sectional view taken along section line A—A in FIG. 5.

DETAILED DESCRIPTION OF A PREFERRED EMBODIMENT

Figure 1:
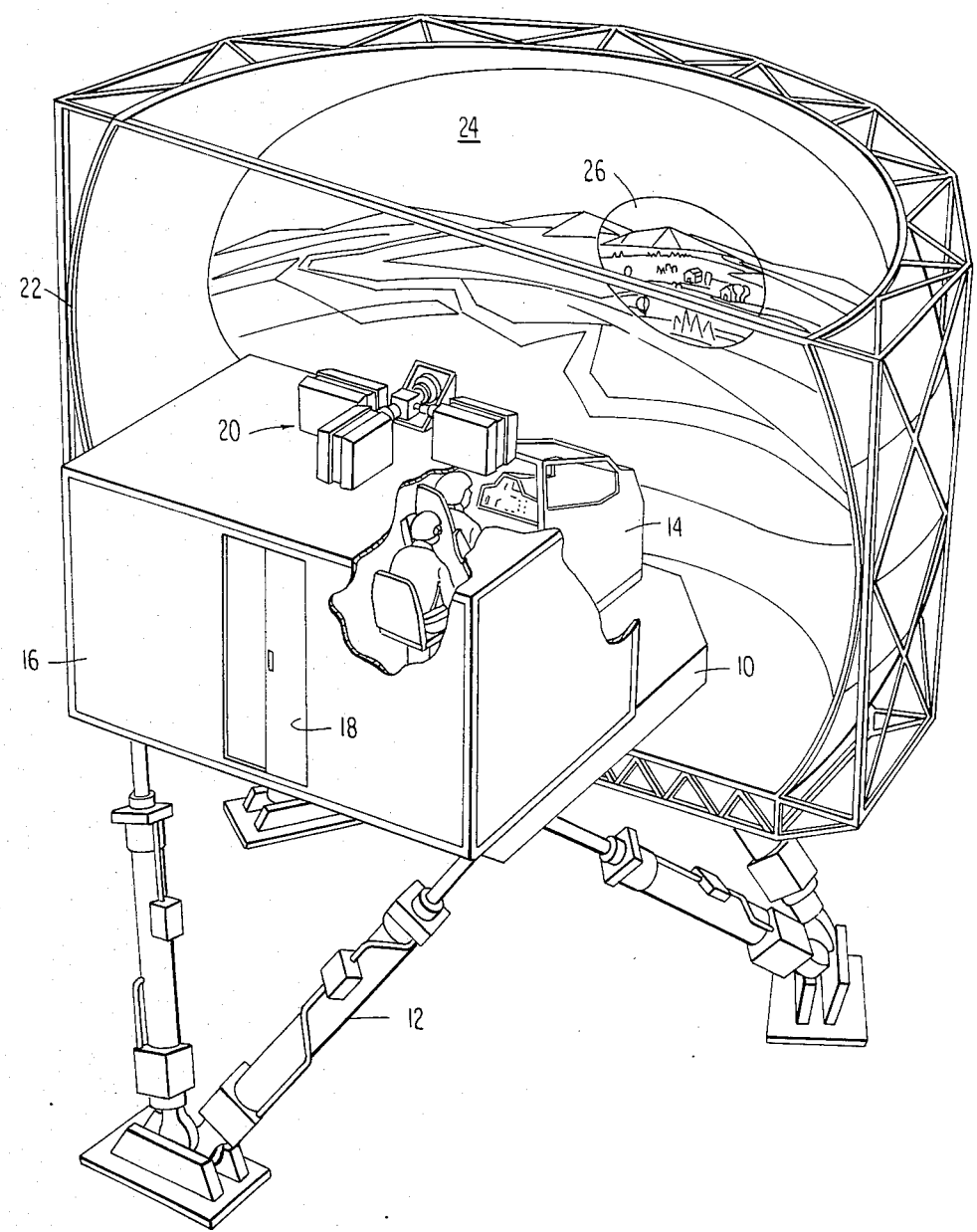
FIG. 1 is a perspective view of a typical flight simulator incorporating a domed surface on which the blended AOI CIG display according to the invention may be projected.

Referring now to the drawings, there is shown in FIG. 1 an exemplary flight simulator comprising a platform 10 supported by a hydraulic servo suspension system 12. An aircraft cockpit 14 is mounted on the platform 10, and behind the cockpit and also mounted on the platform 10 is a housing 16 with a door 18 through which a trainee and an instructor may enter. On top of this housing 16 and generally denoted by the reference numeral 20 are mounted the light valve projectors and the optical servo subsystem according to the invention. The optically blended AOI and background images are projected onto a domed surface 22 which is viewed by the trainee. In the figure, the projected image is illustrated as composed of a larger background image 24 of minimal detail and the more detailed AOI image 26 generally at the center of the background image.

Figure 2:
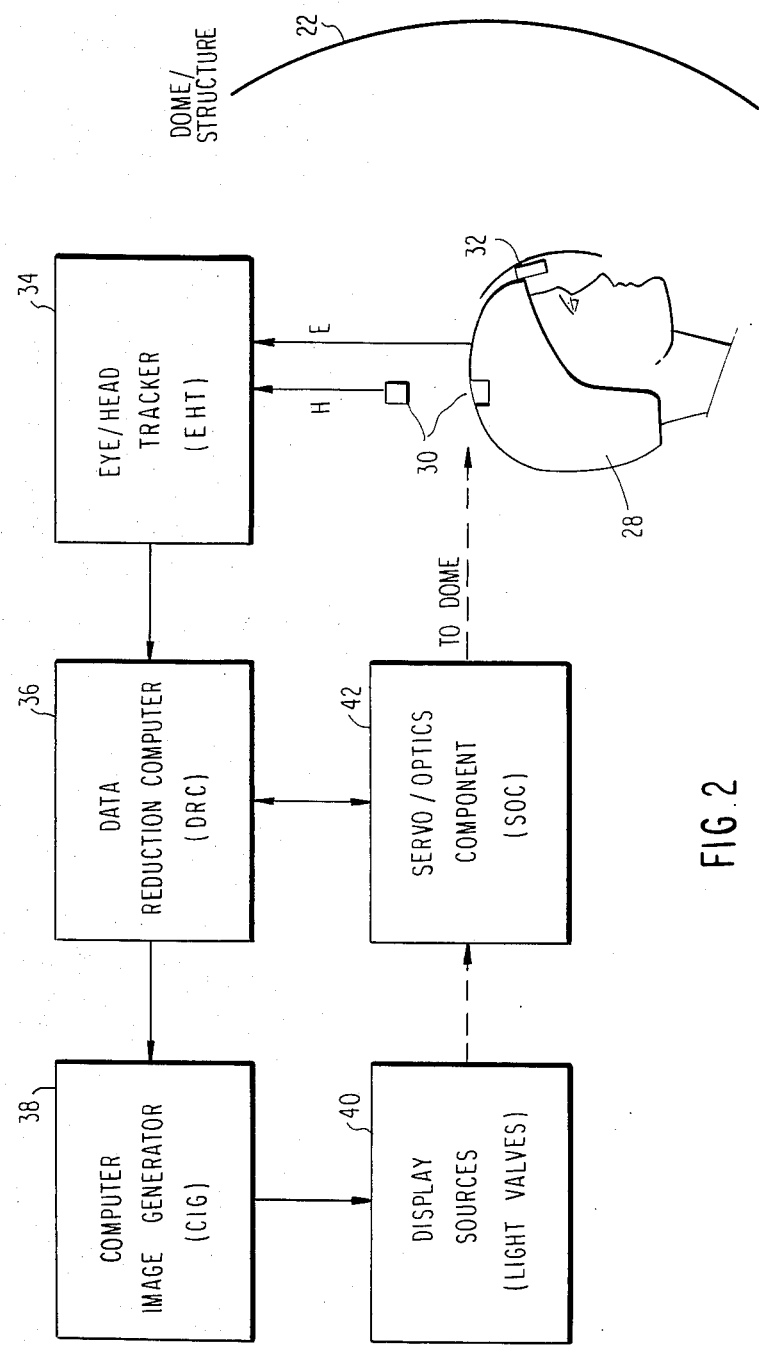
FIG. 2 is a block diagram of the AOI CIG display system according to the invention.

FIG. 2 shows that the trainee wears a pilot's helmet 28 fitted with sensors 30 and 32 for tracking the head and eye movements, respectively, of the trainee. The outputs of these sensors are supplied to an eye/head tracker 34. Both the sensors and the eye/head tracker are well known in the art and so no further description of these devices is provided. The output of the eye/head tracker 34 is supplied to the data reduction computer (DRC) 36 which basically coordinates the computed CIG scene with the positions of the servo/optics component (SOC) 42. The DRC 36 provides information which is used by the computer image generator (CIG) 38 to generate both the background and AOI images. The outputs of the CIG 38 are supplied to the display sources 40, which in the preferred embodiment are Schlieren light valve projectors. It is of course possible to use other display sources such as cathode ray tube (CRT) projection devices but the best results have been attained using the light valve projectors. The projected images are optically blended and projected by the servo/optics component 42 onto the dome 22. The precise point of projection onto the dome 22 is controlled by the DRC 36.

Figure 3:
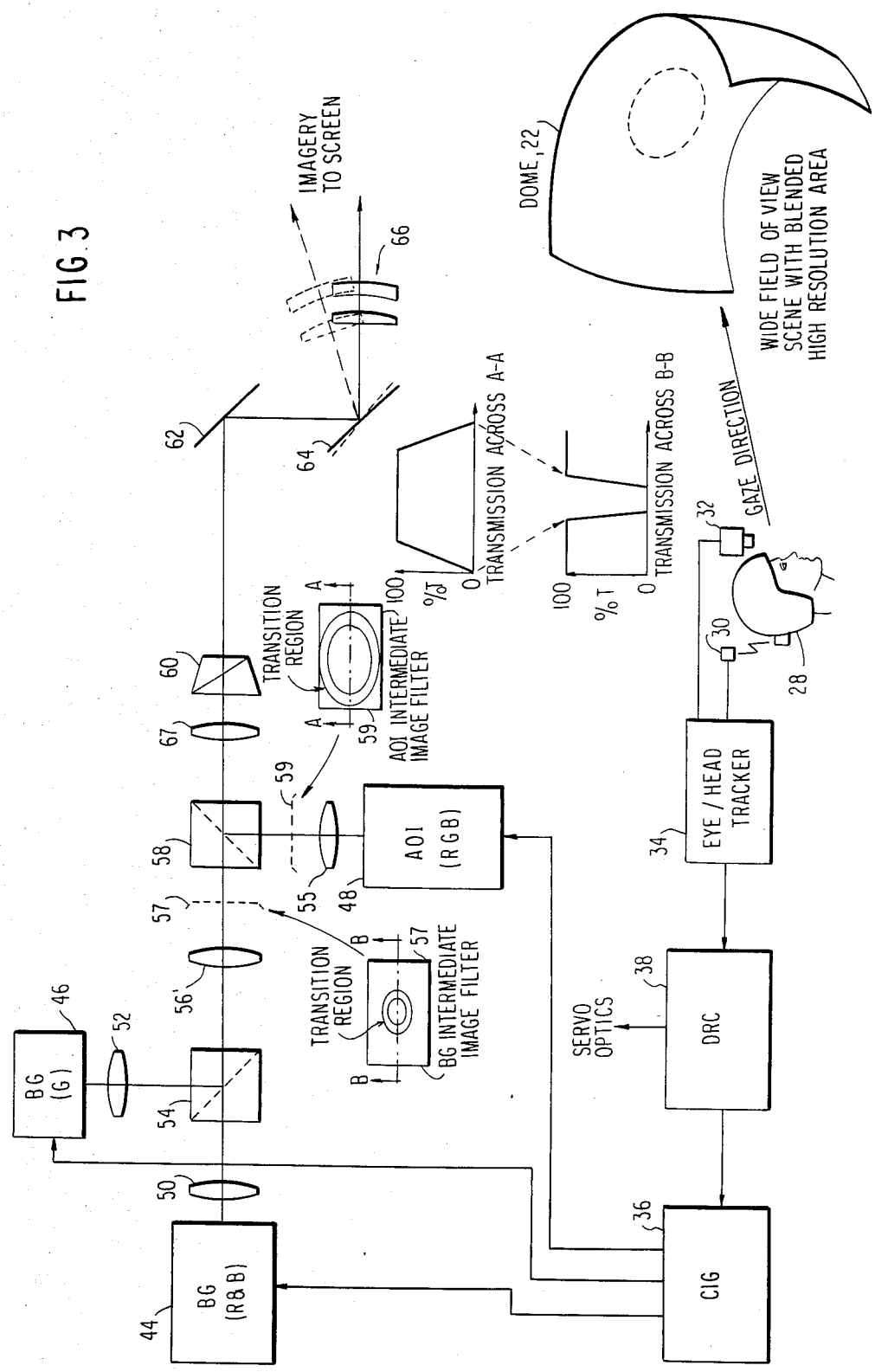
FIG. 3 is a block diagram of the coordinated CIG and optical servo subsystem according to the invention.

The block diagram of FIG. 3 shows the display sources 40 and the servo/optics component in more detail. First, it will be observed that the display sources comprise three Schlieren light valve projectors, two 44 and 46 for the background image and one 48 for the AOI image. The purpose of using two light valve projectors for the background image is to overcome certain limitations on currently available Schlieren light valve projectors for simulation applications. When projecting wide field of views, the single gun light valve suffers from reduced resolution and spurious image effects due to the way the red and blue light signals are achieved and is limited in luminance. Light valve projection systems have been in commercial use for many years, and so it is not the purpose of the present description to provide the reader with a detailed account of the structure and operation of such systems. However, according to a preferred embodiment of the present invention foregoing limitations are overcome by separating the green channel from the red and blue channels as shown in FIG. 4. The red and blue light valve 44 is provided with a color filter plate 45 having separate red and blue zones. The green light valve 46 has a color filter plate 47 for the green component only. In contrast, the conventional filter plate 49 is shown in FIG. 4A. This plate is generally similar to plate 45 in that it is composed of separate zones but the zones are magenta and green. The outputs of the two light valve projectors 44 and 46 are coupled by respective relay lenses 50 and 52 to a dichroic beam splitter 54 which combines the two images to produce a composite image that may be projected by the objective lens 56. While this basic configuration can be altered, the fact that the green channel is combined by the dichroic filter 54 with the other two colors allows a doubling of light output. Since the red/blue light valve 44 projects two rather than three colors, these two colors can be derived in orthogonal directions providing resolution.

Returning now to FIG. 3, instead of a projection lens 56, another relay lens 56' is used, and further along the optical path past this relay lens and the dichroic beam-splitter 54 is a second beam splitter 58. The output of the AOI light valve projector 48 is combined via this beam-splitter 58 by a relay lens 55 so that the common relay lens 67 projects a composite of the AOI and background images. A smooth blending of these images is facilitated by the intermediate image blending filters 57 and 59. The background image blending filter 57 has a transmission characteristic as illustrated comprising a small central essentially opaque area surrounded by a transition region which rises from opaque to 100% transmission. The AOI blending filter 59 is the inverse of filter 57 having a transmission characteristic comprising a large central area of 100% transmission decreasing sharply to opaque.

In the preferred embodiment, the composite image projected by the common relay lens 67 passes through a common derotation prism 60 and is reflected by a fold mirror 62 to the half angle mirror 64 and projection lens 66 which comprise the servo optics. The derotation prism 60 is rotated to remove any rotation of the projected image as a result of slewing the servo optics in azimuth and elevation.

FIG. 5 shows in cross-section the details of the optical system according to a preferred embodiment of the invention. For purposes of clarity of illustration, the left hand portion of the figure is a top view showing the optical coupling of the three light valve projectors 44, 46 and 48, and the right hand portion is a side view showing the optics from the relay lens 67 to the projection lens 66. Associated with the derotation prism 60 are a derotation torque motor 68 and a derotation sensor 69 which form part of the servo control of this optical component. An azimuth torque motor 70 rotates the half angle mirror 64 and projection lens 66 about the azimuth or vertical axis. At the base of the azimuth assembly is an azimuth sensor 71 which with the torque motor 70 forms part of the azimuth servo control. The elevation torque motors 72 and 73 are best seen in FIG. 5A which is a cross-section taken along the section line A—A. An elevation sensor assembly 74 is also part of the elevation servo control.

The details of a preferred embodiment of the invention have been described and illustrated for the purposes of describing the best mode of practicing the invention. However, those skilled in the art will recognize that the broad aspects of the invention may be practiced by other components than those specifically disclosed. What the invention provides is an improved AOI CIG display in which a smooth transition is achieved between the AOI image and the background image. This is accomplished by means of optical blending rather than electronic techniques. And because the AOI and background images are projected and slewed in a common optical system, the AOI and background scene are always in the same relative position to each other. In the preferred embodiment, the display is further enhanced by the use of a composite light valve projector system for the projection of the background image.

We claim:

1. An area of interest display system wherein area of interest imagery of relatively great detail and resolution is displayed in the spatial position of the foveal region of the eye of an observer and background imagery of relatively lesser detail and resolution is displayed about the area of interest imagery, comprising:
   first display means for generating said area of interest imagery;
   second display means for generating said background imagery; and
   optical means coupled to said first and second display means for optically blending and projecting said area of interest imagery and said background imagery, said optical means including:
   (i) first transmission filter means having a central high transmissivity portion surrounded by a transition region intermediate the central high transmissivity portion and a low transmissivity portion for passing said area of interest imagery;
   (ii) second transmission filter means having a central low transmissivity portion surrounded by a transition region intermediate the central low transmissivity portion and a high transmissivity portion for passing said background imagery; and
   (iii) beam splitter means for combining the images passed by said first and second transmission filter means.

2. the area of interest display system as recited in claim 1 further comprising optical servo means coupled to receive the composite image from said beam splitter means for projecting said composite image toward the spatial position where the foveal region of the eye of the observer is directed.

3. The area of interest display system as recited in claim 1 wherein said first and second display means are light valve projectors.

4. The area of interest display system as recited in claim 3 wherein said second display means comprises at least first and second light valve projectors, each projecting different color components of said background imagery.

5. The area of interest display system as recited in claim 4 wherein said second display means is composed of two light valve projectors, one of said light valve projectors projecting the red and blue components of the background imagery and the other of said light valve projectors projecting the green component of the background imagery, the red and blue components and the green component of the background imagery being combined by beam splitter means.

* * * * *